Patented Apr. 8, 1952

2,592,291

UNITED STATES PATENT OFFICE 2,592,291

TEST FILM FOR MOTION-PICTURE PROJECTORS

Edward W. Kellogg, Haddonfield, N. J., assignor to Radio Corporation of America, a corporation of Delaware Application July 6, 1949, Serial No. 103,245

7 Claims. (Cl. 88—19.5)

This invention relates to test films, and particularly to a test film for checking picture film registration in a projection aperture.

Test films are used in the production of motion pictures and in the testing of motion picture equipment, one such type of film, used for testing the contact between negative and positive films in the printing operation, being disclosed and claimed in Blaney U. S. Patent No. 2,255,644 of September 9, 1941. In the projection of motion pictures, wherein each picture frame of the film is advanced intermittently into a projection aperture, accurate registration of each frame in the aperture is necessary in order to avoid what is known as picture "jump." Picture jump is particularly noticeable in the stationary portions of a scene being projected, unless each frame is accurately positioned therein during its projection to the observation medium, so that successive images of all stationary objects appear at identical positions on the screen. There are several causes for this variation in the positioning of the photographic images, such as unequal pull-down strokes or excursions, inaccurate sprockets or other mechanical imperfections, or improper picture gate pressure, any of which can cause variation in the stopping point of each frame.

All that can be expected of a projector is that it bring successive pairs of sprocket holes to the identical position. If the positions of the pictures on the film vary with respect to the perforations, there will be picture jump, no matter how perfectly the projector functions. Therefore, a film for use in testing projectors must maintain a high degree of constancy in the position of the observable image relative to the perforations. There are several expedients for minimizing the variations in image position, such as making the test film on special cameras, or by forming the image by punching a hole through the film simultaneously with the punching of the sprocket holes. Such expedients, however, are not a part of the present invention.

For detecting small amounts of picture jump, high image contrast is essential. Moreover, the sensitiveness of the eye to such unsteadiness is greatest if the image consists of small bright areas with a dark background, and if the screen is free from large bright areas. This means that most of the light reaching the film at the projection aperture must be absorbed by the film, a condition which greatly aggravates the always present problem of excessive heating of the film. It is especially important in the case of a test film that heating be minimized, since the drying out of the film causes warping and shrinkage, both of which adversely affect the dimensional accuracy.

The present invention, therefore, is directed to a type of test film for testing picture jump, which will be little affected by the radiant heat passing through it while it is in the picture gate of a motion picture projector being tested, and which provides an image with a high visual contrast, so that the condition of the projector is easily detected.

It is well-known that the major portion of the heat radiated by a projection lamp is carried by infrared rays, and that, of the visible light, the red rays carry most heat. It has been customary to use the silver photographic image to blacken the dark areas of test films, but such an image absorbs and converts into heat not only all visible light, but all of the infrared as well. On the other hand, most dyes, while absorbing some light in the visible range, are transparent to most of the infrared radiation. Hence, a dye image can produce a visual image of high contrast, while absorbing far less heat than a silver image. It is well-known that the maximum sensitivity of the eye is in the wave-length region of green. Hence, high brightness contrast is obtained with the least total absorption by employing a dye which absorbs green light. This suggests use of a red or magenta dye. There are numerous red dyes which are very efficient, in the sense of high absorption of light of wave-lengths below a certain cut-off point, and very high transmission or little absorption of light of greater wave-lengths, such as red and infrared. Hence, red dye is especially favorable for the present application, and the dye should be present in sufficient concentration to give a deep red.

There are numerous ways of providing the desired dye image, one of the simplest being to punch holes in the film and dye the entire gelatin coating. Another method is to harden the gelatin in certain areas by the well-known bichromate process, rendering the gelatin in the hardened areas resistant to the dye. Dye toning processes are in extensive use in color photography. However, not all processes, which leave a colored image, are appropriate for the present purpose. Those which leave a metallic compound in the emulsion are likely to have some infrared absorption. On the other hand, those which depend for their color entirely on the presence of an organic dye, are in general suitable.

The principal object of the invention, therefore, is to facilitate the testing of motion picture film pull-down mechanisms.

Another object of the invention is to provide an improved test film for checking the registration of a motion picture film in a projection aperture.

A further object of the invention is to provide a test film for checking picture jump in a motion picture projector which has a high visual contrast and is little affected by the radiant heat passing through the film.

Although the novel features which are believed to be characteristic of this invention will be pointed out with particularity in the appended claims, the manner of its organization and the mode of its operation will be better understood by referring to the following description, read in conjunction with the accompanying drawings, forming part hereof, in which:

Fig. 1 is a section of a thirty-five millimeter test film embodying the invention.

Fig. 2 is a section of a sixteen millimeter test film embodying the invention.

Fig. 3 is a perspective view showing the manner of using the test film, and

Fig. 4 is an enlarged view of one form of test pattern.

Referring now to the drawings, Fig. 1 shows a thirty-five millimeter film 5 with sprocket holes 6 and picture frames 7, and one sound track area 8. Although the film is shown with the frames and a sound track area, it is to be understood that these are not necessary on a test film. What is necessary, however, is some test pattern, which may be in different forms, one such form being shown as constant diameter circles 10 positioned accurately with respect to the sprocket holes 6, so that if a projector is operating properly, the circular images 10 will coincide and remain stationary on an observation medium.

To give the images a high contrast with respect to the background and simultaneously reduce the heating of the film to a minimum, the background of the film, shown by the hatched portion, is dyed with an organic dye, preferably red. This dye transmits light with very little absorption of the heat rays and the longer visible rays, which carry the major portion of the heat. Thus, the film will not get as hot as a film with a silver image, and will not dry out and shrink as much, while providing a pattern which is easily observable to determine variations in image registration. The test film is thus provided with dimensional stability, which is of great importance in a test film of this type.

To show the manner of use of the test film, a projector is shown diagrammatically at 12, test film 5 being advanced therethrough, and the image being projected by the objective lens unit 13 to an observation screen 14, the image 10 appearing thereon. If any picture jump is present, it will appear as shown in Fig. 4 by the solid line 15 and the dotted lines 16 and 17.

A similar type of test pattern may be used on a sixteen millimeter film 20, as shown in Fig. 2, this film having sprocket holes 21, picture frames 22, and a similar test pattern 23.

I claim:

1. A motion picture projector test film, comprising an initial transparent film base of a size normally projected by said projector, said film having a repetition of the same test pattern thereon which transmits substantially all visible light rays, the portion of said film surrounding said pattern being dyed with a dye having low heat absorption and which transmits a portion of said visible light rays.

2. A motion picture projector test film in accordance with claim 1, in which said test pattern background is produced by a red dye.

3. A motion picture projector test film in accordance with claim 1, in which said test pattern consists of holes formed in the projection areas of said film in accurate relation to the sprocket holes of said film, and the areas of said film surrounding said pattern are dyed red.

4. A test film for testing picture jump of a projector, comprising an initial clear film base strip having openings in the projected areas thereof, said openings having the same form, shape, and location within each frame with respect to the sprocket holes, the areas surrounding said openings being dyed a color having a low heat absorption, said openings passing substantially all visible light rays and the areas surrounding said openings transmitting heat rays and absorbing part of the visible rays to provide on an observation medium a high contrast between said openings and said dyed areas.

5. A test film for testing picture jump of a projector in accordance with claim 4, in which said color is red.

6. A film for testing motion picture projectors wtih respect to picture steadiness, comprising an initial transparent film base having a repeated test pattern for transmitting substantially all visible light rays, said test pattern being of high visual brightness relative to the surrounding areas when a light image of said pattern is formed, said pattern occupying a small fraction of the entire picture area, said surrounding areas being darkened by the presence of an organic dye which transmits some of said visible light rays to reduce heating of said film.

7. A film for testing motion picture projectors with respect to picture steadiness, comprising an initial clear film base having a repeated test pattern, said test pattern transmitting substantially all visible light rays and being of high visual brightness relative to the surrounding areas when a light image of said pattern is formed, said pattern occupying a small fraction of the entire picture area, said surrounding areas being darkened by the presence of a red dye which transmits some of said visible light rays to reduce heating of said film.

EDWARD W. KELLOGG.

REFERENCES CITED

The following references are of record in the file of this patent:

UNITED STATES PATENTS

| Number | Name | Date |
| --- | --- | --- |
| 1,496,325 | Roth | June 3, 1924 |
| 1,659,176 | Tillyer | Feb. 14, 1928 |
| 2,168,041 | O'Grady | Aug. 1, 1939 |

FOREIGN PATENTS

| Number | Country | Date |
| --- | --- | --- |
| 435,506 | Germany | Oct. 16, 1926 |

OTHER REFERENCES

Journal of the Society of Motion Picture Engineers, vol. 43, No. 1, July 1944, pages 30–36. (Copy in Division 7.)